May 11, 1965 — L. B. JONES — 3,182,610
FREIGHT CARRYING APPARATUS
Filed Sept. 13, 1963 — 5 Sheets-Sheet 1
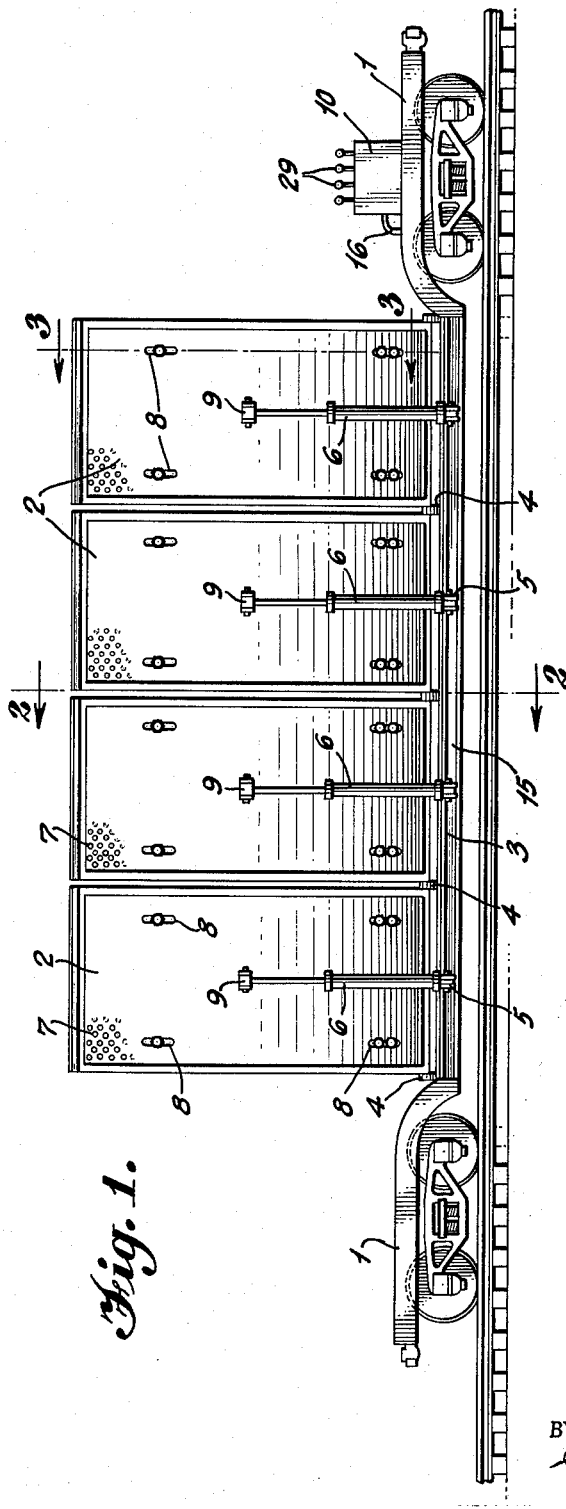
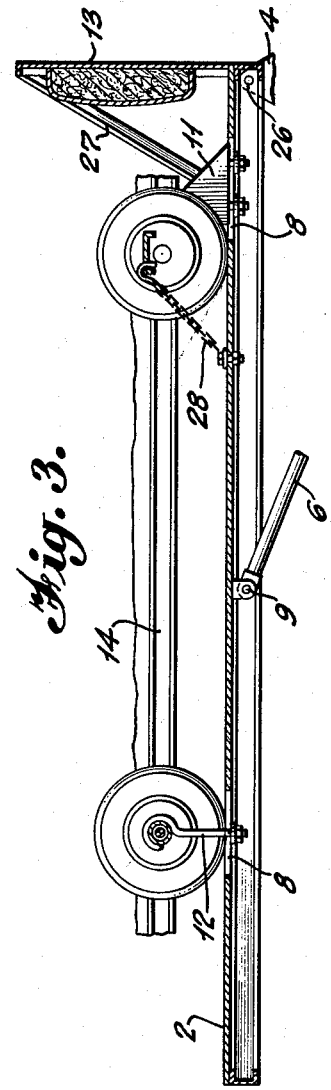
INVENTOR
Louis B. Jones
BY Stevens, Davis, Miller & Mosher
ATTORNEYS

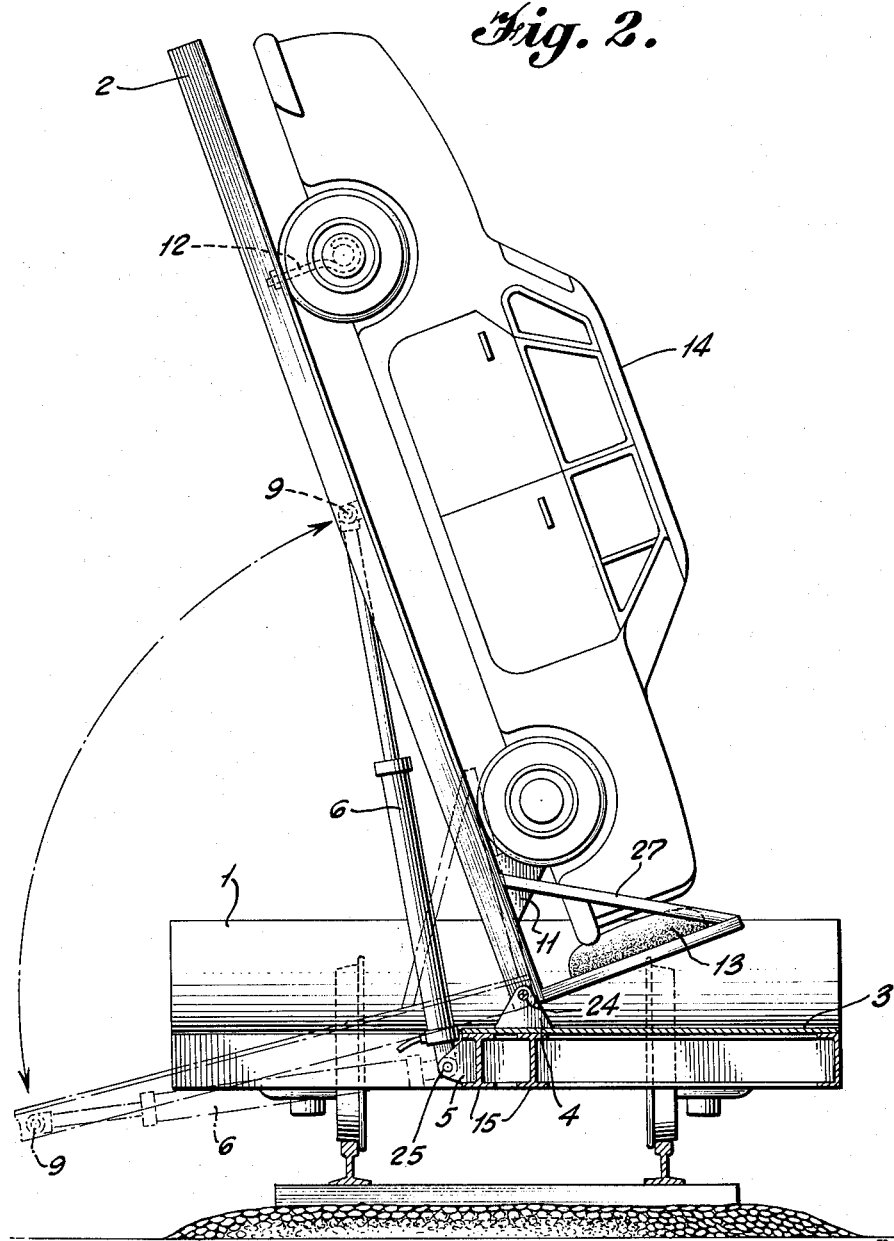

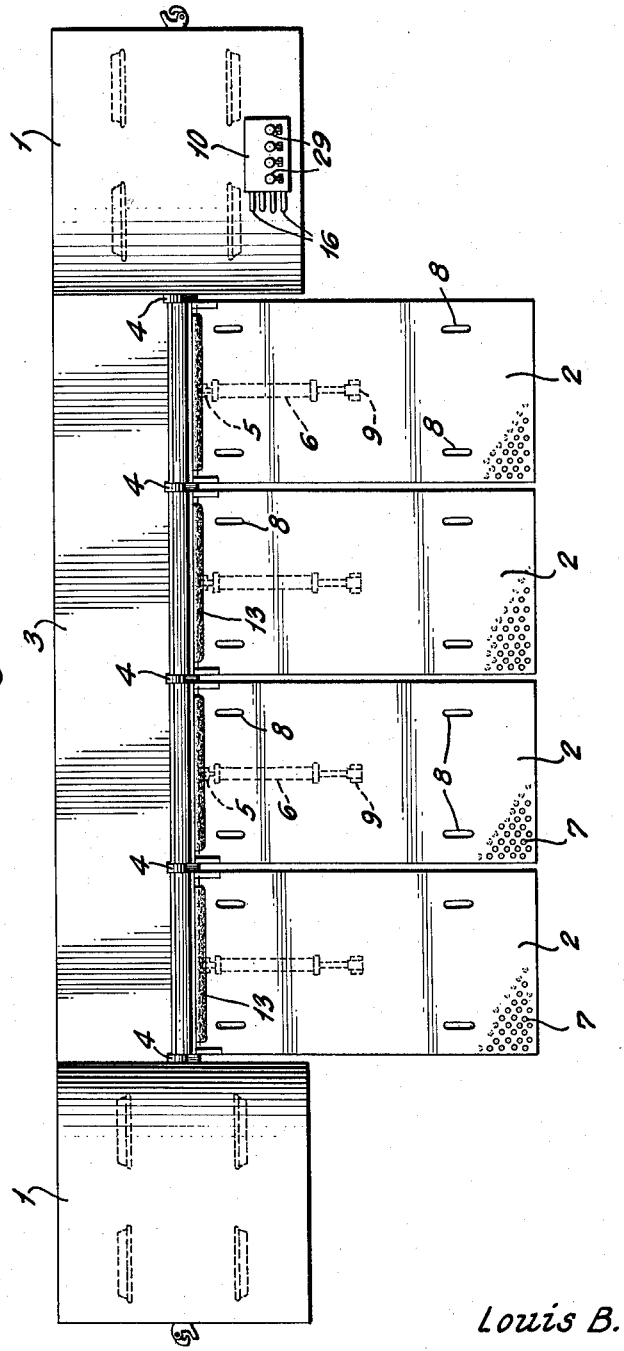

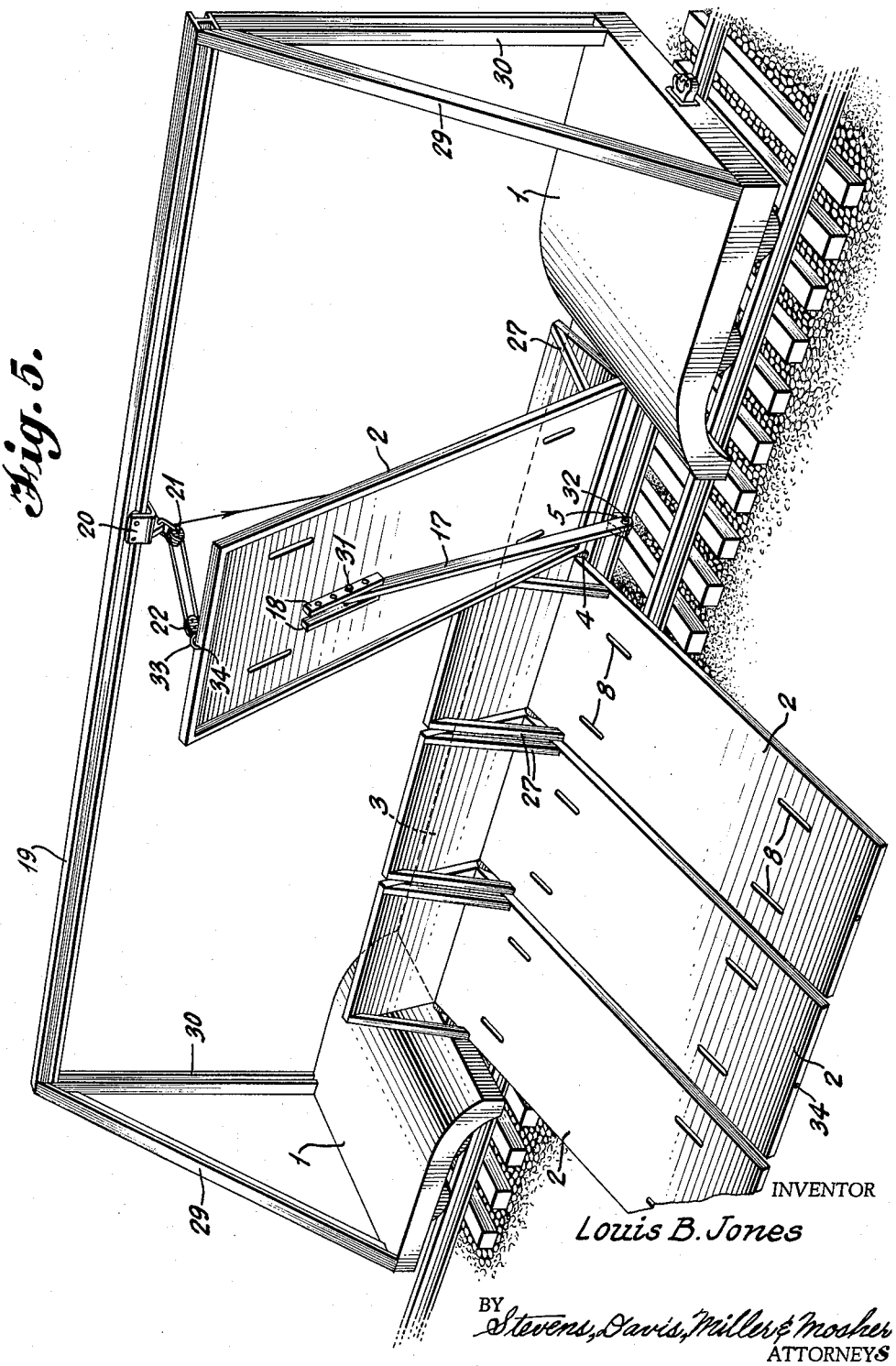

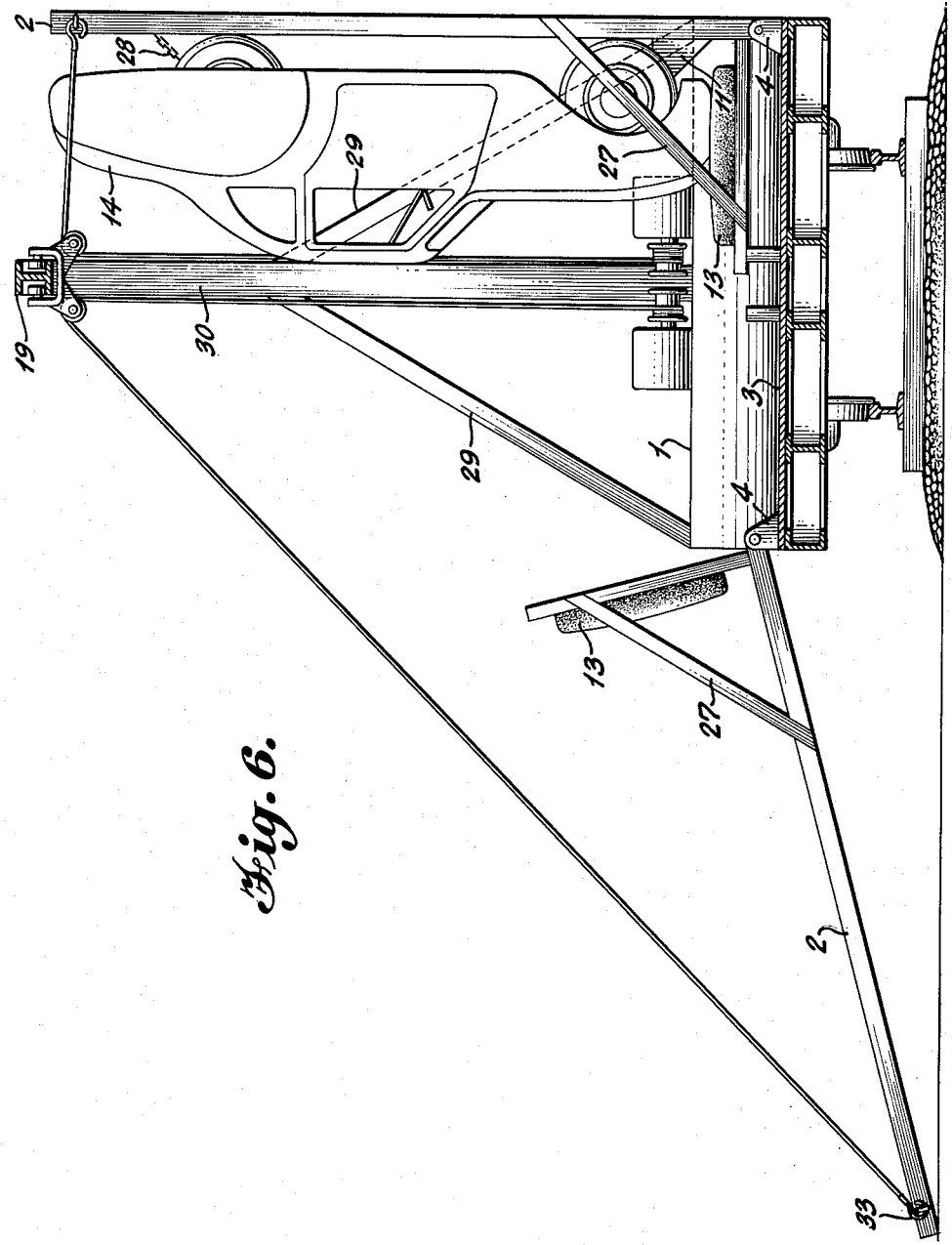

United States Patent Office 3,182,610
Patented May 11, 1965

3,182,610
FREIGHT CARRYING APPARATUS
Louis B. Jones, 5020 Devonshire Road, Richmond, Va.
Filed Sept. 13, 1963, Ser. No. 308,732
10 Claims. (Cl. 105—368)

This invention relates to railway flat cars and other freight carrying apparatus of the type intended for the transportation of wheeled cargoes. More particularly, the invention relates to load carrying platforms allowing each cargo unit or vehicle to roll on and off the said load carrying platforms.

At present the state of the art is such that freight transportation of vehicles unavoidably requires reliance on ancilliary loading and unloading equipment such as: cranes, hoists, specially designed platforms, and/or portable ramps, these means not forming part of the carrier equipment means.

The required use of the above mentioned equipment undesirably results in increased operational costs due to time consuming operations, difficulty in the arrangement and distribution of the cargo on the carrier, complicated steps in the individual loading and unloading of cargo items during the transportation trip, and a less profitable utilization of the carrier freighting possibilities.

Further inconveniences have been met in the art regarding limitations imposed by legal requirements as to the width of freighters, the need of avoiding under all circumstances that the cargo protrudes over the edges of the carrying bed, as well as, limited dimensions of the average clearances in tunnels, bridges, etc.

My invention overcomes the above mentioned inconveniences by means of a specially designed carrier provided with pivotally moving platform units, one for each cargo item, pivotally hinged to the carrier allowing the cargo to roll on and off the platform. While in transit vehicles are positioned with their respective lonigtudinal axes obliquely, and in some cases vertically, oriented on the carrier bed. These features permit substantial savings in the loading and unloading operations coupled with the possibility of carrying a greater number of cargo items than in presently known carriers.

In the various embodiments of my invention, the individual platform units may be movably operated either by means of pulleys or by fluid power means as utilized in a preferred embodiment of my invention.

A principal object of the invention is to provide a freighting apparatus capable of transporting vehicles or other large, heavy and wheeled cargoes with their longitudinal axes obliquely or, in certain cases, vertically oriented in relation to the freighter.

Another object of my invention is to provide a carrier capable of carrying a greater number of cargo items in relation to the capacities of carriers known to the prior art.

A further object of my invention is to permit loading and unloading of railroad flat cars or similar freighting apparatus, without the need for utilizing auxiliary equipment such as cranes, hoists, loading and unloading platforms, or portable ramps, not forming a part of the carrier itself.

An additional object of my invention is to provide the loading and unloading of each cargo item, during the freight trip, without having to move, alter, or change the cargo arrangement on the load carrying bed.

To effect these and related objects, which shall become apparent as the description proceeds, my invention resides in the construction, combination and arrangement of parts as shall be herein more fully described, illustrated in the accompanying drawings, and pointed out in the claims hereunto appended.

For the sake of attaining a simplified, though complete, description of my invention I have elected to disclose it, as installed in a flat railway car. This should not be held as limiting the scope of my invention to a particular type of freight transportation means; it being capable of utilization in any kind of freight carriers such as trucks, ships, planes, and should, accordingly, be understood to include such means.

My invention relates to a railway flat car comprising a body frame. A set of wheels is mounted to the frame. The frame is in general continuously parallel to the rails, but, in a preferred embodiment of my invention has its center body frame portion sloped down to a plane lower than the remaining frame. In said preferred embodiment the body frame includes a recessed margin of the sloped center portion defining an elongated rectangle, while, in other possible embodiments its elongated sides define horizontal straight lines.

Additionally the frame includes a plurality of "I" beams extending beneath the length of the frame in parallel relation and adjacent the longitudinal axis of the frame.

A plurality of rigid platforms define the load carrying means. The said platform being of preferably elongated shape having one end in pivotal moving engagement along the longitudinal axis of the frame in the embodiment featuring the body frame with a recessed margin, and alternatively, in another embodiment, each of said platforms is positioned in pivotal moving engagement in the two opposite, elongated edges of the frame.

Fluid power cylinder-piston assemblies provide means to pivot each platform from a down position, in which its free end protrudes substantially beyond a longitudinal edge of the frame, to an up position, in which the free end of the platform is within the permissible width for such vehicles. The mentioned fluid power means additionally include lock means for each assembly to lock it when in its up position, a source of fluid power operatively positioned on the body frame including a number of power control means, one for each assembly, and conduit means operatively connecting the said power control means and the said assemblies.

A plurality of bored brackets provide hinging means for the said load carrying platforms, and the ends of the cylinder-piston, fluid power assemblies. A first series of said brackets securely positioned on the body frame and spaced along its longitudinal axis, two for each load carrying platform. A second series of said brackets are securely positioned on the body frame, one for each cylinder-piston assembly below the said first series of brackets.

The load carrying platforms include bores defined on their ends adjacent the longitudinal axis of the frame, and further include a pivotal hinge beneath each load carrying platform fixed at a point equidistant from its elongated sides and substantially remote from the longitudinal axis of the frame. Each cylinder-piston assemblies includes bored hinge means at their respective opposite ends.

A number of bolts engage bores defined in the brackets of the first series and the bores defined in the load carrying platforms. An additional number of bolts engage the bores of the second series of brackets and the lower ends of the cylinder-piston assembly, while a further additional number of bolts engage each pivotal hinge beneath the load carrying platform with an opposite end of the cylinder-piston assembly, thus providing the pivoting means for the load carrying means and the cylinder-piston assemblies.

The said load carrying platforms further include stop and anchoring means mounted on the platforms for engaging and anchoring a cargo positioned on the platform.

The said stop means comprise either a number of cavities on the platform surface, or alternatively, slanted chock stops movably secured in slots in the platforms. The anchoring means are movably secured in the said slots and include rigid and/or flexible hooks or other conventional securing means to hold the cargo when in up position.

Shock absorbing matted cushions provide the load carrying platforms with shock absorbing means when the platforms are in their up position. These matted cushions are positioned at the end of the platforms adjacent the longitudinal axis of the body frame, being vertically oriented, and may be joined to the said end of the platform either by means of a plank in registry with the transverse dimension of the platform, or by means of a number of struts securing the cushion to said end.

With reference to the accompanying drawings, which form a part thereof, preferred embodiments of the present invention are illustrated.

FIGURE 1 is a side elevational view of one preferred embodiment of the invention featuring fluid power cylinder-piston assemblies to operate the load carrying platform units;

FIGURE 2 is a transverse sectional view along line 2—2 of FIGURE 1 showing the load carrying platforms with an item of cargo therein placed;

FIGURE 3 is a transverse sectional view along line 3—3 of FIGURE 1 showing anchoring and stop means on the load carrying platforms securing the cargo thereto;

FIGURE 4 is a top plan view with hidden parts in dotted line, of a preferred embodiment of the invention showing the load carrying platforms in a lowered position;

FIGURE 5 is a perspective view of another embodiment of the invention showing one of the load carrying platforms in its uppermost position; and FIGURE 6 is a transverse sectional view of another embodiment of the invention showing the loading and unloading platforms operationally hinged for pivotal movement on brackets secured at opposite edges of a railroad car frame.

In a preferred embodiment of my invention the railway flat car furnished with the freight carrying apparatus is shown in FIGURE 1. Reference numeral 1 designates the opposite end portions of the car body frame slanting downwardly, a center portion of the body frame 3 is normally disposed in parallel relationship with the railway tracks and positioned on a plane lower than the opposite end portions 1 of the frame. The said center portion 3 of the body frame transversely extending away from the longitudinal axis of the car center to a point defining a longitudinal straight line in registry with one side of the opposite end portions of the car bed 1. Numeral 2 designates rigid load carrying means in the form of longitudinally elongated preferably rectangular platform units arranged adjacent the longitudinal axis of the car center. In FIGURE 1, the platforms 2 are shown in their uppermost position, obliquely inclined, this being a load carrying position. Numeral 7 indicates the platform as a perforated plate, the perforations being intended to diminish the weight of the platform in order to facilitate the operation of a fluid power cylinder-piston assembly 6 movably lifting and lowering the platforms 2. Reference numeral 4 designates a number of brackets spacedly secured to the body frame 3, two for each load-carrying platform, featuring bores 24 positioned in pivotal moving engagement with corresponding bores 26 positioned in the vertices of the platforms 2 in registry with bores 24, and secured thereto by conventional means (not shown). A number of elongated slots 8 on platforms 2 each adjacent a platform angle are provided to secure thereon chock stops 11 and anchoring hooks 12 and 28 to prevent movement of the load while in transit.

A pivotal hinge 9 is positioned longitudinally and transversely from corresponding sides of the platforms 2. The upper portion of a fluid power cylinder-piston assembly 6 is pivotally connected to said hinge 9. While the lower portion of said cylinder 6 is in pivotal moving engagement with the second bracket means 5 positioned adjacent the external portion of one of "I" beams 15 (not shown), and secured by conventional means to a bore 25 (not shown), on said bracket means 5. A source of fluid power 10 is shown positioned on an end portion 1 of the flat car featuring a number of controls 29 in numerical relation to the number of platforms 2. Numeral 16 illustrates means communicating from the said fluid power source 10 to the cylinder-piston assembly 6 for the operative actioning thereof to raise and lower the platforms 2.

FIGURE 2 shows the operative movement of the roll on, roll off loading and unloading operation. It will be noted that the bracket means 4 are secured to the upper part of the frame 3, such brackets having bores 24 in pivotal moving engagement and in registry with bores 26 positioned in the vertices of the platforms 2. A number of "I" beams 15 are provided extending beneath the length of the frame 3, and disposed laterally and adjacent the inner edge portion of the frame 3. The second bracket means 5 are secured to the "I" beams 15 nearest the inner edge of the frame 3, these bracket means include bores 25. The pivotal hinge 9 is secured midway to the under portion of the platforms 2. A cylinder-piston assembly 6 is positioned under the said platforms 2 to permit vertical swinging movement of the platforms 2. The cylinder-piston assembly 6 in its upper portion pivotally engages the said hinge 9, and its lower portion is in pivotal moving engagement and in registry with a bore 25 positioned in the brackets 5 at a point remote from the said "I" beams 15. Numerals 12 and 11, respectively, illustrate anchoring means in the form of hooks and chock stops secured to the load carrying platform 2. The anchoring hooks are situated in elongated slots 8 (not shown), adjacent the angle portions of the platform 2. An item of cargo 14 is obliquely positioned on the platform 2 secured by anchoring hooks 12 and chock stops 11 and resting on a matted cushion 13 vertically positioned on an end of the load carrying platform 2. Struts 27 extend in angular orientation from a point on the platform 2 to a point adjacent the upper part of the matted cushion support means.

For the purpose of operationally utilizing the freight carrying apparatus, a platform 2 is brought to a lowered position as indicated in FIGURE 4. An item of cargo 14 will then, by its own motion, roll on the platform to a point in which its front part is in contact engagement with a cushion 13 uprightly secured to a platform end as shown in FIGURE 2. Rigid anchoring hooks 12 are removably secured to the rear of the cargo item 14 and flexible anchoring hooks 28 are removably secured to the front part of the cargo 14. The chock stops 11 are fixed in contact engagement with the front part of the cargo item 14.

The fluid power control means 29 on fluid power source 10 are in operative communication through conduits 16 with a cylinder-piston assembly 6 to raise the item of cargo 14 to an oblique position as indicated in FIGURE 2. The unloading operation is performed by actuating the said cylinder-piston assembly 6, to lower the platform 2, disengaging chock stops 11, anchoring hooks 12 and 28; and allowing the cargo item to roll off the platform 2.

Another embodiment of the invention is shown in the drawings identified by FIGURE 5. In it a railroad flat car comprising a roll on, roll off loading and unloading apparatus is shown. In this embodiment the flat car has opposite end portions of the car body frame 1 slanted downwardly to the truck wheel portion of the car defining a body frame center portion 3. Frame 3 extends transversely from the longitudinal axis of the car center to a point defining a longitudinal straight line in registry with one side of the said opposite end portions 1.

A number of "I" beams 15 (only one being shown), one adjacent the other under the frame 3, the beams 15 extending in parallel longitudinal orientation in registry with and under an edge of frame 3. First bracket means 4, two to each load carrying platform secured to the frame 3 spaced along its length, each such bracket having a bore (not shown). A plurality of load carrying platforms 2 are provided, arranged adjacent the longitudinal axis of the car center. Platforms 2 are disposed in pivotal moving engagement with bores (not shown) in the first brackets 4. A pair of perforated strengthening means 18 in parallel longitudinal orientation are positioned substantially midway beneath the load carying platform 2 adjacent a point substantially remote from the said first brackets 4. A number of elongated slots 8 are provided adjacent an angled portion of the load carrying platforms 2. Each bracket 5 having a bore (not shown) at a point remote from the "I" beam 15. Bracing means with a rigid link member having bores at its opposite ends are provided, secured respectively to the strengthening means 18 and the bracket means 5 by bolts 31 and 32.

Also, in the modified form a matted cushion 13 is vertically oriented at an end of the load carrying platform. Bracing means 27 for the load carrying platform comprising a pair of struts fixedly secured in angular orientation to the load carrying platforms and the matted cushion. Also, a girder spanning over the center axis of the body frame, including two upright beams 30 positioned at opposite remote edges of the body frame 1 supporting a horizontal cross beam 19. There is further provided frame bracing means comprising a pair of strut beams 29 extending in angular orientation from a point on the uppermost juncture of beams 19 and 30 to a point on frame 1 remote therefrom. Pulley carrier means 20 slidably fixed on cross beam 19, first pulley means 21 on the pulley carrier means operatively connected to a second pulley 22 provided with a hook 33 to be inserted in perforation 34 positioned in a transverse portion of the ramp 2 remote from the car bed 3 intended to pivotally lift the load carrying means to a substantially oblique load carrying position and to pivotally lower the said load carrying means with substantial contact engagement with the ground.

A further embodiment of the invention best shown on FIGURE 6 of the drawings shows a freight carrying apparatus comprising two sets of rigid, load carrying platform units 2 operatively hinged for pivotal movement with a number of brackets 4 securely fixed to opposite remote edges of the freight car bed 3.

The structures herein disclosed constitute a preferred embodiment of the invention. It should be understood that other structures might be adopted which do not depart from the teachings herein incorporated. Such are deemed to come within the purview of the invention.

What I claim is:

1. A roll on, roll off freight car apparatus for the transportation of wheeled cargo comprising an elongated body frame, a center portion of said elongated body frame being lower than the end portions thereof, said lowered body frame portion including a recessed marginal edge defining a recessed car surface in registry therewith, a number of I beams longitudinally extending beneath and reinforcing said freight car surface, one of said I beams in registry alignment with a recessed portion of said marginal edge, a first number of brackets on said lowered surface, said brackets spacedly extending longitudinally of said lowered surface and adjacent said recessed surface portion, each said bracket including an end perforation remote from said surface, a second number of brackets longitudinally spaced along and fixed to an outwardly facing portion of an I beam, each of said second number of brackets positioned below and substantially equidistant between each pair of said first number of brackets, each bracket of the second group including an end perforation remote from said I beam, a plurality of load carrying platforms spaced along the long axis of the frame, each platform having its pivotal axis extending longitudinally of the lowered portion of the frame and hinged for pivotal movement with a pair of said first number of brackets, pivoting means under each platform for the pivoting thereof from a down position in which the free end protrudes substantially beyond the longitudinal edge of the frame and in which a wheeled cargo can be rolled on and off to an up position in which the free end of the platform is within the permissible width for such vehicles, said pivoting means having one end operatively hinged to the under mid-portion of a platform adjacent its free end, and the other end hinged to one of said second number of brackets, wheel stop and anchoring means mounted on the platform for engaging and anchoring a wheeled cargo positioned on the platform, lock means on the pivoting means to lock each platform in its up position, shock absorbing means mounted on each platform adjacent its pivoted end in substantial right angle engagement therewith against which shock absorbing means a cargo can bear when the platform has been pivoted to its up position.

2. A roll on, roll off freight car apparatus for the transportation of wheeled cargo comprising an elongated body frame, a center portion of said elongated body frame being lower than the end portions thereof, said lowered body frame portion including a recessed marginal edge defining a recessed car surface in registry therewith, a number of I beams longitudinally extending beneath and reinforcing said freight car surface, one of said I beams in registry alignment with a recessed portion of said marginal edge, a first number of brackets on said lowered surface, said brackets spacedly extending longitudinally of said lowered surface and adjacent said recessed surface portion, each said bracket including an end perforation remote from said surface, a second number of brackets longitudinally spaced along and fixed to an outwardly facing portion of an I beam, each of said second number of brackets positioned below and substantially equidistant between each pair of said first number of brackets, each bracket of the second group including an end perforation remote from said I beam, a plurality of load carrying platforms spaced along the said marginal edge, each platform having its pivotal axis extending longitudinally of the lowered portion of the frame and hinged for pivotal movement with a pair of said first number of brackets, each of the platforms being comprised of a perforated plate and including a number of slots extending normal to the pivoting axis of the plate, a number of wheel stops movably mounted in said slots, a number of anchoring hooks movably mounted in the said slots for engaging and anchoring the front and rear portions of a wheeled cargo on the platform, pivoting means under each platform for the pivoting thereof from a down position in which the free end protrudes substantially beyond the longitudinal edge of the frame and in which a wheeled cargo can be rolled on and off to an up position in which the free end of the platform is within the permissible width for such vehicles, said pivoting means comprising a number of fluid piston and cylinder assemblies, one under each platform, said pivoting means having one end operatively hinged to an under mid-portion of a platform adjacent its free end, and the other end hinged to one of said second number of brackets, wheel stop and anchoring means mounted on the platform for engaging and anchoring a wheeled cargo positioned on the platform, lock means on the pivoting means to lock each platform in its up position, shock absorbing means mounted on each platform adjacent its pivoted end in substantial right angle engagement therewith against which shock absorbing means a cargo can bear when the platform has been pivoted to its up position, a source of fluid power operatively positioned on the body frame, the said source including a number of power control means, one for each assembly, and conduit means operatively connecting the said power control means and the said assemblies.

3. A roll on, roll off freight car apparatus for the transportation of wheeled cargo comprising an elongated body frame, a center portion of said elongated body frame being lower than the end portions thereof, said lowered body frame portion including a recessed marginal edge defining a recessed car surface in registry therewith, a number of I beams longitudinally extending beneath and reinforcing said freight car surface, one of said I beams in registry alignment with a recessed portion of said marginal edge, a first number of brackets on said lowered surface, said brackets spacedly extending longitudinally of said lowered surface and adjacent said recessed surface portion, each said bracket including an end perforation remote from said surface, a second number of brackets longitudinally spaced along and fixed to an outwardly facing portion of an I beam, each of said second number of brackets positioned below and substantially equidistant between each pair of said first number of brackets, each bracket of the second group including an end perforation remote from said I beam, a plurality of load carrying platforms spaced along the said marginal edge, each platform having its pivotal axis extending longitudinally of the lowered portion of the frame and hinged for pivotal movement with a pair of said first number of brackets, each of the platforms being comprised of a perforated plate and including a numbed of slots extending normal to the pivoting axis of the plate, a number of wheel stops movably mounted in said slots, a number of anchoring hooks movably mounted in the said slots for engaging and anchoring the front and rear portions of a wheeled cargo on the platform, pivoting means under each platform for the pivoting thereof from a down position in which the free end protrudes substantially beyond the longitudinal edge of the frame and in which a wheeled cargo can be rolled on and off to an up position in which the free end of the platform is within the permissible width for such vehicles, said pivoting means having one end operatively hinged to an under mid-portion of a platform adjacent its free end, and the other end hinged to one of said second number of brackets, wheel stop and anchoring means mounted on the platform for engaging and anchoring a wheeled cargo positioned on the platform, lock means on the pivoting means to lock each platform in its up position, shock absorbing means mounted on each platform adjacent its pivoted end in substantial right angle engagement therewith against which shock absorbing means a cargo can bear when the platform has been pivoted to its up position.

4. A roll on, roll off freight car apparatus for the transportation of wheeled cargo comprising an elongated substantially rectangular body frame, a center portion of said elongated body frame being lower than the end portions thereof, a number of I beams longitudinally extending beneath and reinforcing said freight car surface, one of said I beams in registry alignment with the longitudinal outline of the car surface, a first number of brackets on said lowered surface, said brackets spacedly extending longitudinally of said lowered surface at both elongated sides thereof, each said bracket including an end perforation remote from said surface, a second number of brackets longitudinally spaced along and fixed to an outwardly facing portion of an I beam, each of said second number of brackets positioned below and substantially equidistant between each pair of said first number of brackets, each bracket of the second group including an end perforation remote from said I beam, a plurality of load carrying platforms spaced along the long axis of the frame on opposite elongated sides of said frame, each platform having its pivotal axis extending longitudinally of the lowered portion of the frame and hinged for pivotal movement with a pair of said first number of brackets, each of the load carrying platforms being comprised of a perforated plate and including a number of slots extending normal to the pivoting axis of the plate, a number of wheel stops movably mounted in said slots, a number of anchoring hooks movably mounted in the said slots for engaging and anchoring the front and rear portions of a wheeled cargo on the platform, pivoting means under each platform for the pivoting thereof from a down position in which the free end protrudes substantially beyond the longitudinal edge of the frame, to an up position in which the free end of the platform is within the permissible width for such vehicles, said pivoting means having one end operatively hinged to an under mid-portion of the platform adjacent its free end, and the other end hinged to one of said second number of brackets, wheel stop and anchoring means mounted on the platform for engaging and anchoring a wheeled cargo positioned on the platform, lock means on the pivoting means to lock each platform in its up position, and shock absorbing means mounted on each platform adjacent its pivoted end in substantial right angle engagement therewith against which shock absorbing means a cargo can bear when the platform has been pivoted to its up position.

5. A roll on, roll off freight car apparatus for the transportation of wheeled cargo comprising an elongated substantially rectangular body frame, a center portion of said elongated body frame being lower than the end portions thereof, a marginal edge defining a recessed car surface in registry, a number of I beams longitudinally extending beneath and reinforcing said freight car surface, one of said I beams in registry alignment with the longitudinal outline of the car surface, a first number of brackets on said lowered surface, said brackets spacedly extending longitudinally of said lowered surface at both elongated sides thereof, each said bracket including an end perforation remote from said surface, a second number of brackets longitudinally spaced along and fixed to an outwardly facing portion of an I beam, each of said second number of brackets positioned below and substantially equidistant between each pair of said first number of brackets, each bracket of the second group including an end perforation remote from said I beam, a plurality of load carrying platforms spaced along the long axis of the frame on opposite elongated sides of said frame, each platform having its pivotal axis extending longitudinally of the lowered portion of the frame and hinged for pivotal movement with a pair of said first number of brackets, each of the load carrying platforms being comprised of a perforated plate and including a number of slots extending normal to the pivoting axis of the plate, a number of wheel stops movably mounted in said slots, a number of anchoring hooks movably mounted in the said slots for engaging and anchoring the front and rear portions of a wheeled cargo on the platform, pivoting means under each platform for the pivoting thereof from a down position in which the free end protrudes substantially beyond the longitudinal edge of the frame, to an up position in which the free end of the platform is within the permissible width for such vehicles, said pivoting means having one end operatively hinged to an under mid-portion of the platform adjacent its free end, and the other end hinged to one of said second number of brackets, wheel stop and anchoring means mounted on the platform for engaging and anchoring a wheeled cargo positioned on the platform, lock means on the pivoting means to lock each platform in its up position, anchoring means mounted on each platform for securing a cargo, and shock absorbing means mounted on each platform adjacent its pivoted end in substantially right angle engagement therewith against which shock absorbing means a cargo can bear when the platform has been pivoted to its up position, a source of fluid power operatively positioned on the body frame, the said source including a number of power control means, one for each assembly, and conduit means operatively connecting the said power control means and the said assemblies.

6. A roll on, roll off freight carrying apparatus as set forth in claim 3 wherein said means to pivot each platform comprise a girdered frame spanning over an elongated side of the bed frame, movable pulley means on the girder for engaging the load carrying platforms for pivoting.

7. A roll on, roll off freight carrying apparatus as set forth in claim 4 wherein said means to pivot each platform comprise a girdered frame spanning over the center axis of the bed frame, movable pulley means on the girdered frame for engaging the platforms for pivoting.

8. A roll on, roll off freight carrying apparatus as set forth in claim 1 wherein the load carrying platforms when pivoted and locked in their up position stand in oblique angular orientation in respect to the longitudinal axis of the frame.

9. A roll on, roll off freight carrying apparatus as set forth in claim 2 wherein the load carrying platforms when pivoted and locked in their up position stand in oblique angular orientation in respect to the longitudinal axis of the frame.

10. A roll on, roll off freight carrying apparatus as set forth in claim 3 wherein the load carrying platforms when pivoted and locked in their up position stand in oblique angular orientation in respect to the longitudinal axis of the frame.

References Cited by the Examiner
UNITED STATES PATENTS

| | | | |
|---|---|---|---|
| 2,123,362 | 7/38 | Isaacson | 105—368 |
| 2,129,950 | 9/38 | Loney | 105—368 |
| 2,151,431 | 3/39 | Lord | 105—368 |
| 2,190,708 | 2/40 | Fowler | 105—368 |
| 2,567,328 | 9/51 | Fahland | 105—368 |
| 2,918,326 | 12/59 | Antaramian | 296—1 |
| 2,933,053 | 4/60 | Mellam | 105—368 |
| 2,996,020 | 8/61 | Udstad | 105—367 |
| 3,023,711 | 3/62 | Rolfe | 105—368 |
| 3,067,699 | 12/62 | Fredriks | 105—366 |

MILTON BUCHLER, *Primary Examiner.*
LEO QUACKENBUSH, *Examiner.*